J. L. SCHULTZ & A. C. WESTLAKE.

MANUFACTURE OF STOVE BOARDS.

No. 11,444. Reissued Oct. 2, 1894.

Witnesses:

J. W. Winn

Peter A. Ross

Inventors:

John L. Schultz

Adelaide C. Westlake by Henry Connett his Attorney

THE NORRIS PETERS CO., PHOTO-LITHO., WASHINGTON, D. C.

UNITED STATES PATENT OFFICE.

JOHN L. SCHULTZ AND ADELAIDE C. WESTLAKE, OF BROOKLYN, NEW YORK; SAID SCHULTZ ASSIGNOR TO SAID WESTLAKE.

MANUFACTURE OF STOVE-BOARDS.

SPECIFICATION forming part of Reissued Letters Patent No. 11,444, dated October 2, 1894.

Original No. 494,968, dated April 4, 1893. Application for reissue filed May 1, 1894. Serial No. 509,724.

*To all whom it may concern:*

Be it known that we, JOHN L. SCHULTZ and ADELAIDE C. WESTLAKE, both citizens of the United States, and residents of Brooklyn, Kings county, New York, have invented certain new and useful Improvements in the Manufacture of Stove-Boards, of which the following is a specification.

Our invention relates to the class of stove boards which are of sheet metal and have wood backings and which are commonly known in the trade as wood-lined boards as distinguished from paper-lined boards.

It has always been desirable, for the sake of economy in both cost of construction and cost of transportation, to employ a thin wooden lining, but up to the present time, so far as we are aware, manufacturers have not been able to employ a backing or lining of the desired thinness for various reasons that we need not here explain.

The object of our present invention is to produce a wood-lined board having a very thin lining, and we attain this end by the instrumentalities and method to be hereinafter described, and which constitute the novel features of our invention.

In the accompanying drawings which serve to illustrate our invention.—Figure 1, is a plan view of the under side of an oblong stove board embodying our improvements, and Fig. 2, is a longitudinal section of the same. Figs. 3 and 4, are detached views, on a large scale, of the preferred form of clip employed in the manufacture, as will be hereinafter explained; and Figs. 5 and 6, are similar views illustrating modified forms of said clip. Figs. 7, 8, 9, and 10, are views illustrating the method of manufacture employed in making the board.

Referring to Figs. 1 to 10, we will explain how we proceed to construct an oblong board with rounded corners.

A, is the sheet metal portion of the board, which may be crystallized tin for example. By means of dies or the like a flange, $a$, is turned on the margin of the sheet A, all around, as seen in the illustrative view Fig. 7. By means of the other dies, or suitable tools, another flange $a^{\times}$, is turned inward along the edge of the flange $a$, when the flanged edge of the sheet A will present the appearance seen in Fig. 8. The integral hollow flanged sheet which is rectangular in plan, with quarter circle curves at the corners, is now laid face down on a table or the like and the sections of the thin wooden lining placed in position. This lining, which need not be more than one-fourth of an inch thick for an ordinary board, comprises two end-pieces, $b$, $b$, having their respective ends rounded to fit the curves of the corners of the sheet A and two side-pieces, $c$, $c$, which latter will usually be wider than the end-pieces, in an oblong board. The width of the end-pieces $b$ must not exceed very much the radius of the curves at the ends of the piece. These end-pieces of the lining are first placed in position on the upper side of the plate A, and then pushed in under the overhanging flange $a^{\times}$. The side-pieces $c$ are next placed in position and pushed in under the overhanging flange $a^{\times}$. These pieces will be cut, as to length, so as to fit snugly between the end-pieces, as seen in Fig. 1. The four thin pieces, $b$, $b$, $c$, $c$, form a frame-like, thin lining, over which the continuous integral flange, $a^{\times}$, extends throughout the entire margin of the board.

The clips, $d$, which secure the end-pieces of the lining to the side-pieces thereof where the ends of the latter abut against the former, will now be applied. The preferred form of this clip, is illustrated in Fig. 3. It consists of two L-shaped, bent pieces of sheet metal, as tin plate for example, placed with their upright flanges face to face and secured by a rivet or rivets $d^{\times}$, set down close to the base flanges. This clip is inserted by slipping its base flanges the one under the end-piece and the other under the adjacent side-piece, in such a manner that the united upright flanges can be passed edgewise into the narrow space between the sections of the lining. The upright flanges are now hammered or flattened down, one upon the end-piece and the other upon the side-piece, and secured by setting down portions of the metal into the wood with a punch, as indicated at $d'$, in Fig. 4, which shows the clip as applied, on a large scale. The clips $d$ serve to unite the adjacent sections of the wood lining and prevent them from moving past each other by the flexure of the board, and thus add greatly to the stiffness of the board, by holding them firmly at the same level edge to edge.

In order to hold the metal down to the lining along the inner edges of the sections thereof, other fasteners, *e*, are employed. These are as herein shown similar in construction to the well known paper fastener and are passed through the metal sheet and the lining from the upper to the lower side thereof and clinched down on the lining. The margin of the board is now passed through suitable rolls, which presses the flange $a^{\times}$ down and applies it firmly to the lining and forces its margin down into the wood as seen in Fig. 10, at $a'$.

Fig. 9 shows the positions of the parts after the wooden lining has been placed under the overhanging flange *a* and before the final operation just described. As the flange $a^{\times}$ holds the sections of the wooden lining in place with respect to each other at their outer edges, the clips *d* and *e* will be placed near their inner edges where they would be otherwise free. The oblong board, when the difference in its dimensions is considerable, may have a transverse, centrally arranged lining-section $b^{\times}$, as seen in Fig. 1, which will be secured at its respective ends to the side-pieces by clips *d*, as before described.

The board, when otherwise finished as described, may have a backing of paper, *f*, pasted to the wood lining, in such a manner as to cover the clips and impart a finish to the under side of the board. Only small fragments of said paper are represented in Fig. 1.

By forming the hollow flange on the margin of the plate primarily over square, metallic dies, instead of forming it over the edge of the wooden lining, we are enabled to produce a perfectly square and uniform edge on the board instead of an irregular, rounded edge.

Figure 1:
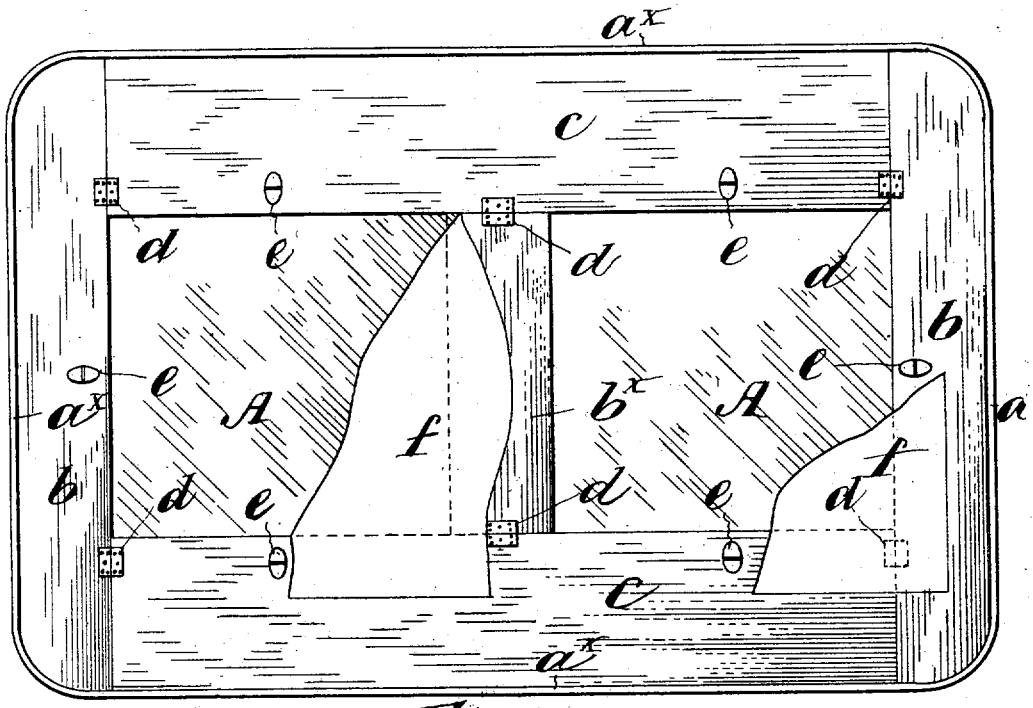
Figure 2:
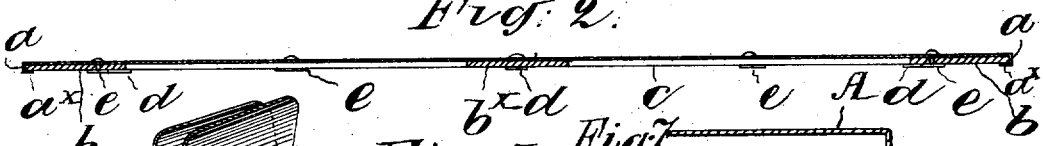
Figure 3:
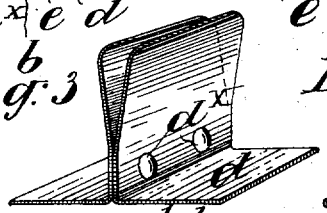
Figure 5:
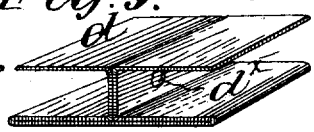
Fig. 5 shows a modification of the clip *d*, in which only one piece of sheet metal is employed instead of two. This clip will serve, but it cannot be made of such small scraps of metal as the other and the base flange is of two thicknesses or plies which must be interposed between the sheet A and the lining.
Figure 7:
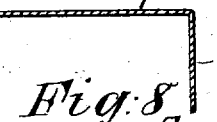
Figure 8:
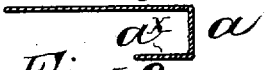
Figure 4:
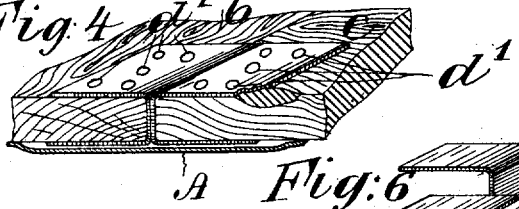
Figure 9:
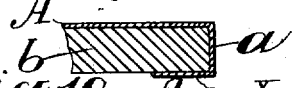
Figure 10:
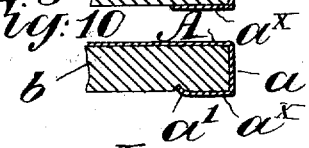
Figure 6:
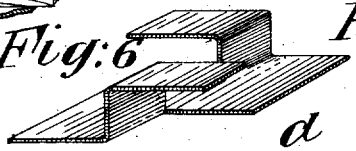
Fig. 6 illustrates another form of the clip in one piece. This clip requires no rivets.

Our board is light, stiff, of inexpensive construction, and packs closely for transportation.

We would state that while we prefer to have the base flange of the clip *d* housed between the metal A and the wooden lining, this flange may be exterior to the metal, the upright portion of the clip passing through a slit in the latter. This arrangement will be too obvious to require illustration.

We have described the mode we prefer for assembling or putting together the elements of our board, but this mode need not necessarily be adhered to in carrying out our invention.

Having thus described our invention, we claim—

1. As an improved article of manufacture, a stove board composed of a seamless sheet of metal A having an inturned flange extending entirely around its margin, a lining composed of thin sections of wood, *b* and *c*, the outer edges of which take under the said flange, and metal fasteners which extend through the metal sheet and wood lining sections near the inner margins of the latter and are clinched down, substantially as and for the purposes set forth.

2. As an improved article of manufacture, a stove board composed of a seamless sheet of metal, A, having an inturned flange extending entirely around its margin, a lining composed of thin sections of wood, *b* and *c*, the outer edges of which take under said flange, clips *d*, which secure together the adjacent sections of wood, and metal fasteners which extend through the metal sheet and wood lining and are clinched down on the latter, substantially as and for the purposes set forth.

3. As an improved article of manufacture, a stove board composed of a seamless sheet of metal, A, having an inturned flange around its margin, a lining composed of thin sections of wood, *b* and *c*, the outer edges of which take under the flange on the plate, and clips *d*, which secure together the adjacent sections of wood, the flanged portions at one end of the clips being housed between the metal sheet A and the wood lining, substantially as set forth.

In witness whereof we have hereunto signed our names in the presence of two subscribing witnesses.

JOHN L. SCHULTZ.
ADELAIDE C. WESTLAKE.

Witnesses:
JOHN H. TISSOT, Jr.,
WILLIAM WESTLAKE.